United States Patent
Esken et al.

(10) Patent No.: US 7,311,594 B2
(45) Date of Patent: Dec. 25, 2007

(54) COMBINE HARVESTER

(75) Inventors: Dirk Esken, Soest-Meckingsen (DE);
Martin Niermann, Harsewinkel (DE);
Dieter Amsbeck, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 11/366,636

(22) Filed: Mar. 2, 2006

(65) Prior Publication Data

US 2006/0205452 A1    Sep. 14, 2006

(30) Foreign Application Priority Data

Mar. 4, 2005    (DE) .................. 10 2005 010 592

(51) Int. Cl.
*A01F 12/00*    (2006.01)

(52) U.S. Cl. .................. 460/59; 460/99; 460/119

(58) Field of Classification Search .................. 460/59, 460/66, 99, 100, 115, 119
See application file for complete search history.

(56) References Cited

U.S. PATENT DOCUMENTS

| 4,208,858 A | * | 6/1980 | Rowland-Hill | 56/14.6 |
| 4,307,732 A | * | 12/1981 | De Busscher et al. | 460/99 |
| 4,610,127 A | * | 9/1986 | Eguchi et al. | 56/14.6 |
| 5,624,315 A | * | 4/1997 | Jonckheere | 460/99 |
| 6,773,343 B2 | * | 8/2004 | Schlautman et al. | 460/99 |

FOREIGN PATENT DOCUMENTS

DE        34 22 106        12/1984

* cited by examiner

*Primary Examiner*—Thomas B. Will
*Assistant Examiner*—Alicia Torres
(74) *Attorney, Agent, or Firm*—Michael J. Striker

(57) ABSTRACT

A self-propelled combine harvester has a threshing mechanism composed of at least one aggregate selected from the group consisting of a threshing part, a working unit, and both, at least one stripping unit which is assigned to the at least one aggregate, and at least one rotary chamber configured on the at least one stripping unit on a circumference of the at least one aggregate.

6 Claims, 3 Drawing Sheets

COMBINE HARVESTER

BACKGROUND OF THE INVENTION

The present invention relates to a self-propelled combine harvester with a threshing mechanism.

A combine harvester with a threshing mechanism is made known in DE 34 22 106 that is composed essentially of a cylinder and an impeller, both of which are located in a machine housing. A guide is located above the cylinder that divides the crop flow into two flows to direct the crop material, evenly distributed, to the separator portion.

The disadvantage of these known threshing mechanisms is that the rotating drums produce an air current that moves opposite to the direction of flow of the crop material through the combine harvester. This air current carries the dustlike portion of the crop material in the direction of travel of the combine harvester and out of the feed rake, and it hinders the driver's view of the front attachment and/or the field during the harvesting operation.

SUMMARY OF THE INVENTION

The object of the present invention, therefore, is to avoid the disadvantages of the related art and, in particular, to prevent dustlike crop material from exiting out of the front of the feed rake of the combine harvester.

In keeping with these objects and with objects which will become apparent hereinafter, one feature of the present invention resides, briefly stated, in a self-propelled combine harvester, comprising a threshing mechanism composed of at least one aggregate selected from the group consisting of a threshing part, a working unit, and both; at least one stripping unit which is assigned to said at least one aggregate; and at least one rotary chamber configured on said at least on stripping unit on a circumference of said at least one aggregate.

Due to the fact that at least rotary chambers is configured on the at least one stripping unit on the circumference of at least one threshing part and/or at least one working unit, the air current produced by the threshing parts and/or the working units is directed into the rear region of the machine housing.

Due to the fact that the threshing part(s) and/or the working unit(s) are located in a machine housing, the stripping unit extending from the machine housing nearly to the circumference of the threshing part and/or the working unit, an air current moving past between the machine housing and the threshing part and/or the working unit is nearly blocked.

The rotary chamber is advantageously formed by a housing that matches at least a portion of the circumferential surface of the threshing part or the working unit and, in the circumferential direction of the threshing part or the working unit, has at least one opening that faces away from the direction of rotation of the threshing part of the working unit, so that the air current exiting the threshing part or working unit flows into the housing.

When the stripping unit is height-adjustable, the gap between the threshing part or working unit and the stripping element can be adjusted.

When the stripping unit is mounted such that it can move in the manner of a pendulum, it can move out of the way if, e.g., the stripping elements stop stripping off material wound around the threshing part or the working unit, thereby preventing the threshing part or working unit from being blocked and/or the stripping unit from being damaged.

Due to the fact that the stripping unit mounted such that it can move in the manner of a pendulum is acted upon with a return force, the stripping unit does not move out of the way until acted upon by the return force. As such, it is not continually moved back and forth by small quantities of overshot crop material conveyed by the impeller, but rather only by large quantities of crop material that extend past the circumference of the impeller.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
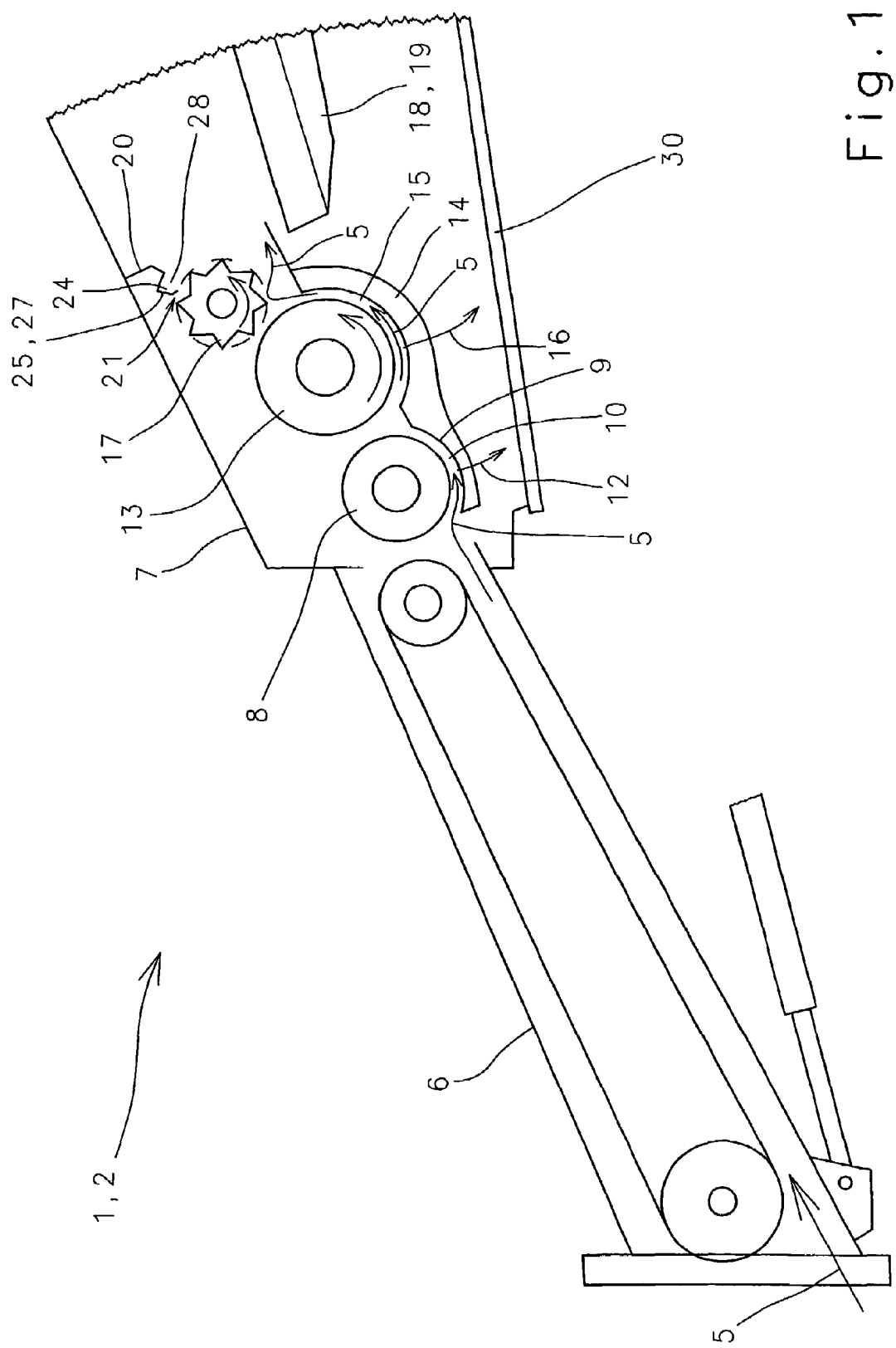
FIG. 1 shows a schematic side view of a combine harvester in accordance with the present invention.

FIG. 1 shows part of a schematic side view of an agricultural harvesting machine 2 designed as a self-propelled combine harvester 1. Combine harvester 1 includes a feed rake 6 on the front side, a not-shown front attachment being assigned to feed rake 6 to cut and pick up the crops grown in the field, the front attachment conveying the crop material to feed rake 6. Feed rake 6 conveys crop material 5 to threshing parts and working units 8, 13, 17 located in machine housing 7.

Crop material 5 exiting feed rake 6 is caught by preliminary cylinder 8 rotating in the counterclockwise direction, preliminary cylinder 8 being bordered on its underside by a threshing and separating grate 9. Crop material 5 is drawn by preliminary cylinder 8 through threshing gap 10 located between preliminary cylinder 8 and threshing and separating grate 9, crop material 5 being guided in its direction by threshing and separating grate 9. Preliminary cylinder 8 processes crop material 5 intensively, so that the kernels are separated from the fruit of crop material 5. A crop-material flow 12 composed mainly of kernels is separated by threshing and separating grate 9 and conveyed downstream to working unit 30, which are not described in greater detail.

A further cylinder 13, which also rotates in the counterclockwise direction, is located downstream of preliminary cylinder 8, in its rear region. The crop material exiting the rear region of threshing gap 10 is captured by cylinder 13 and conveyed by cylinder 13 through a threshing gap 15 bordered by cylinder 13 and a threshing and separating grate 14 located below cylinder 13, crop material 5 being conveyed along threshing and separating grate 14. When crop material 5 is conveyed through threshing gap 15, the crop material 5 is conveyed through threshing gap 15, the crop material is processed intensively, so that further kernels are separated from the fruit of crop material 5. A second crop-material flow 16, which is also composed mainly of kernels, is separated on threshing and separating grate 14 and is also conveyed to further working units 30, which are not described in greater detail.

It is within the scope of the present invention for combine harvester 1 to have any number of cylinders positioned one behind the other, it being possible for the cylinders to have any type of configuration.

In the rear region, an impeller 17 that rotates in the counterclockwise direction is assigned to cylinder 13, impeller 17 catching crop material 5 exiting threshing gap 15 and conveying it to a separating unit 18, e.g., a tray-type shaker 19. The present invention is expressly not limited to these types of combine harvesters. Instead, it also relates, e.g., to combine harvesters having at least one rotor as the separating unit.

Figure 3:
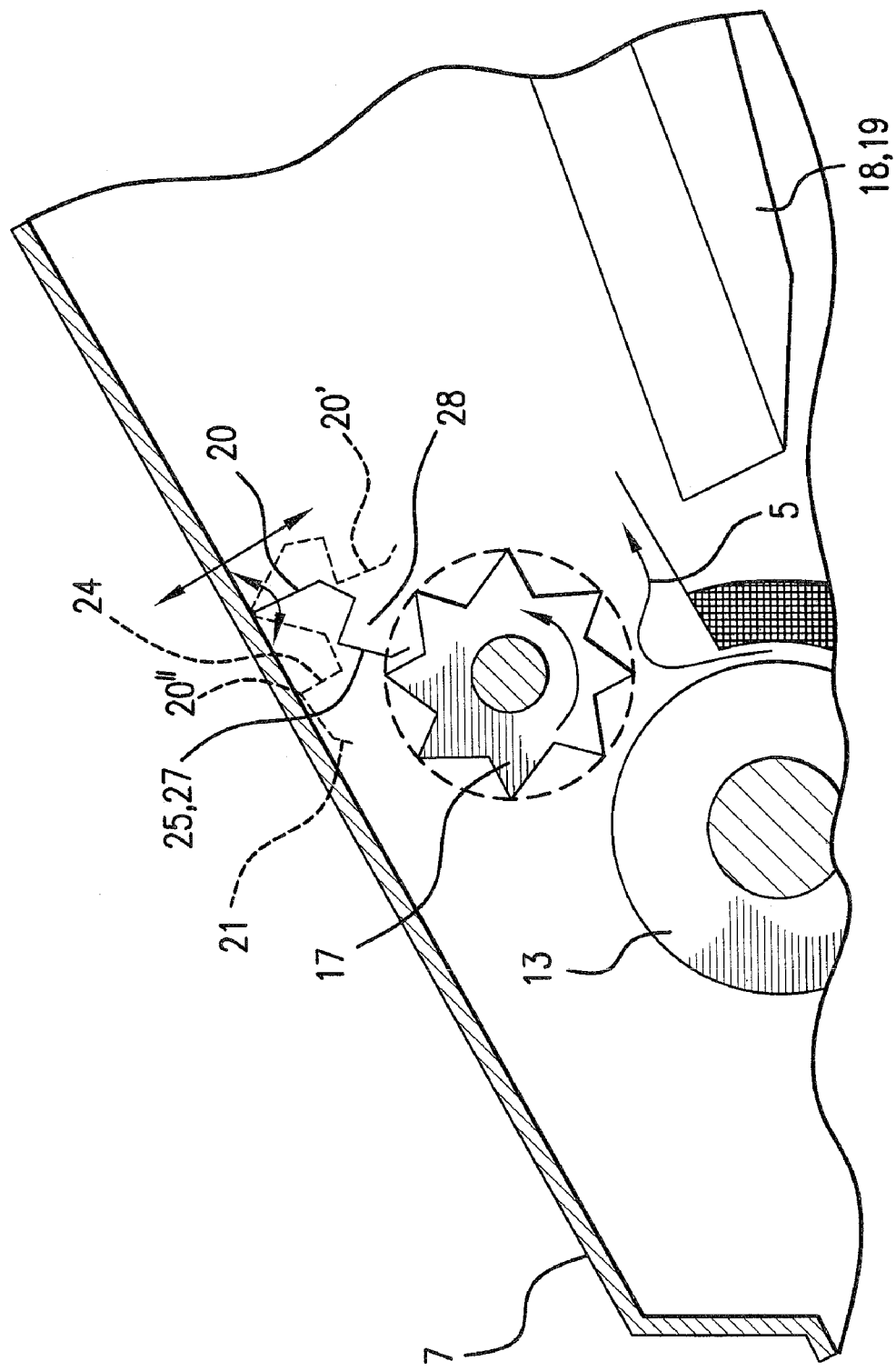
FIG. 3 shows an enlarged view of the stripping unit of the combine harvester in accordance with the present invention.

A stripping unit 20 is located above impeller 17, which limits the quantity of crop material conveyed by impeller 17 by stripping off any crop material that extends past the circumference of impeller 17. Stripping unit 20, which is mounted on machine housing 7 in a height-adjustable manner at a plurality of heights between positions which are shown in FIG. 3 and identified with reference numerals 20'and 20", extends continually from machine housing 7 nearly to the circumference of impeller 17, a gap 21 remaining between the circumference of impeller 17 and stripping unit 20, to prevent collisions. It is feasible that stripping unit 20 is supported on machine housing 7 such that it can move in the manner of a pendulum, so it can move out of the way, if necessary, when crop material 5 is not stripped away by stripping unit 20. Stripping unit 20, which is mounted such that it can move in the manner of a pendulum, can be acted upon with a return force, so that stripping unit 20 is not continually moved back and forth by small quantities of overshot crop material conveyed by impeller 17, but rather only by large quantities of crop material that extend past a circumference of impeller 17.

A rotary chamber 24 according to the present invention and to be described in greater detail below is configured on stripping unit 20 at the circumference of impeller 17, rotary chamber 24 redirecting the air current produced by rotating impeller 17 into the rear region of the combine harvester 1. It is within the scope of the present invention that stripping units can also be located above cylinders 8, 13, it being possible for rotary chambers according to the present invention to also be configured at the circumference of associated cylinders 8, 13. Rotary chamber 24 according to the present invention is formed by a housing 25 that matches a portion of the circumferential surface of impeller 17, housing 25 being formed by a bent profile 27 that has an opening 28 in the circumferential direction of impeller 17. Opening 28 of housing 25 faces away from the direction of rotation of impeller 17.

The air current produced by impeller 17 flows into housing 25 and produces a vortex in the region of rotary chamber 24. The subsequent air current conveyed by impeller 17 is redirected past the vortex into the rear region of machine housing 7. Rotary chamber 24 is therefore responsible for redirection the air current conveyed by impeller 17 into the rear region of combine harvester 1, and the dustlike crop material is conveyed with the air current into the rear part of machine housing 7.

Figure 2:
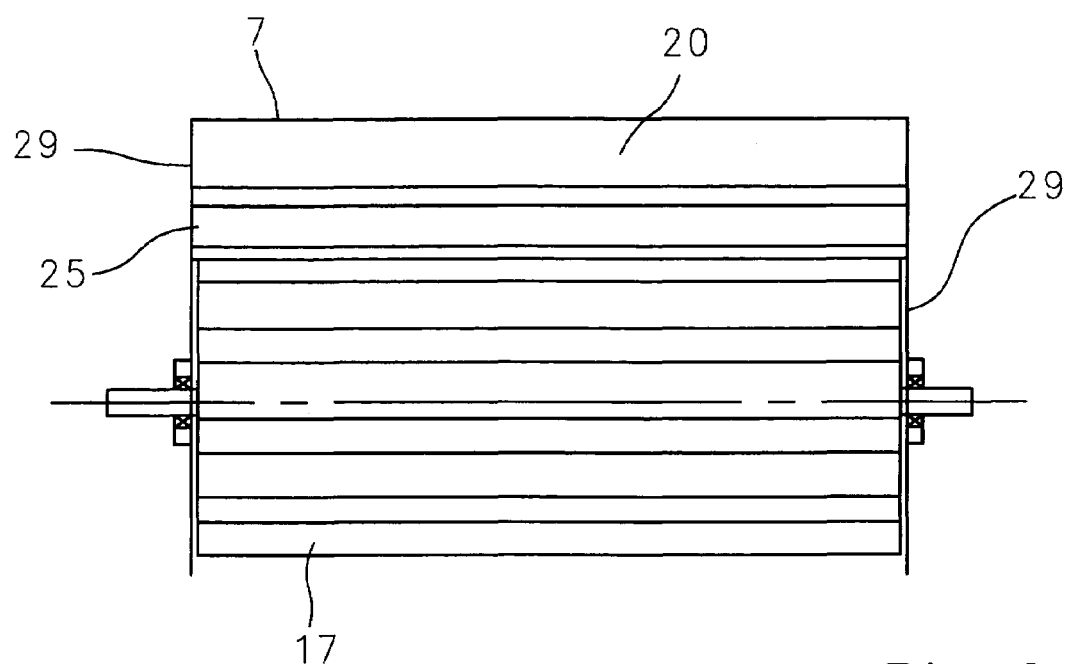
FIG. 2 shows an impeller with the stripping unit, in a rear view of the combine harvester in accordance with the present invention.

FIG. 2 shows an impeller 17 with stripping unit 20 located above it, in a rear view. Stripping unit 20 extends across with width of impeller 17, and housing 25 is bounded at the ends of profile 27 by side panels 29 of machine housing 7.

It is within the scope of ability of one skilled in the art to modify the exemplary embodiments described in a manner not presented, or to use them in other machines to achieve the effects described, without leaving the framework of the invention.

It will be understood that each of the elements described above, or two or more together, may also find a useful application in other types of constructions differing from the types described above.

While the invention has been illustrated and described as embodied in a combine harvester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelled combine harvester, comprising a threshing mechanism including at least one cylinder with a threshing and separating grate forming a gap therebetween and configured for threshing crop material and thereby separating kernels from a fruit of the crop material, at least one impeller with at least one stripping unit assigned to said at least one impeller and configured for catching the threshed crop material exiting said threshing gap and for conveying the threshed crop material; and at least one rotary chamber configured on said at least one stripping unit of said threshing mechanism at an outer circumference of said at least one impeller of said threshing mechanism so as to redirect an air current produced by said impeller of said threshing mechanism into a rear region of the combine harvester.

2. A self-propelled combine harvester as defined in claim 1; and further comprising a machine housing, said at least one impeller of said threshing mechanism being located in said machine housing, said at least one stripping unit of said threshing mechanism extending from said machine housing to nearly a circumference of said impeller.

3. A self-propelled combine harvester as defined in claim 1, wherein said rotary chamber is formed by a housing matching at least a portion of a circumferential surface of said impeller of said threshing mechanism and also having at least one opening in a circumferential direction of said impeller of said threshing mechanism that is opposite to a direction of rotation of said impeller of said threshing mechanism so as to direct the air current from said impeller of said threshing mechanism to the rear region of the combine harvester.

4. A self-propelled combine harvester as defined in claim 1, wherein said stripping unit of said threshing mechanism is configured so that it is height-adjustable.

5. A self-propelled combine harvester as defined in claim 1, wherein said stripping unit of said threshing mechanism is mounted such that it is movable in a manner of a pendulum.

6. A self-propelled combine harvester as defined in claim 5, wherein said stripping unit of said threshing mechanism which is mounted such that it is movable in a manner of a pendulum, is acted upon with a return force.

* * * * *